United States Patent [19]
Bernstein et al.

[11] Patent Number: 6,026,144
[45] Date of Patent: *Feb. 15, 2000

[54] METHOD FOR IMPROVING THE ADMINISTRATION OF THE TELEPHONE LOCAL LOOP PLANT

[75] Inventors: Lawrence Bernstein, Short Hills; Brent E. Coy, Morristown, both of N.J.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/605,979

[22] Filed: Feb. 23, 1996

[51] Int. Cl.⁷ ..................................................... H04M 1/24
[52] U.S. Cl. ................................. 379/1; 379/9; 379/14; 379/12
[58] Field of Search ............................. 379/1, 225, 227, 379/268, 9, 10, 14–15, 12; 359/118, 124–125, 157, 164, 173

[56] References Cited

U.S. PATENT DOCUMENTS

| | | |
|---|---|---|
| 4,257,119 | 3/1981 | Pitroda . |
| 5,165,091 | 11/1992 | Lape et al. . |
| 5,187,732 | 2/1993 | Suzuki ....................................... 379/15 |
| 5,274,692 | 12/1993 | Lechner et al. ........................... 379/10 |
| 5,386,417 | 1/1995 | Daugherty et al. ........................ 370/54 |
| 5,572,347 | 11/1996 | Burton et al. . |
| 5,576,874 | 11/1996 | Czerwiec et al. ......................... 359/123 |
| 5,594,576 | 1/1997 | Sutherland et al. ...................... 359/118 |
| 5,729,370 | 3/1998 | Bernstein et al. ........................ 359/119 |
| 5,757,793 | 5/1998 | Read et al. ................................ 370/358 |

Primary Examiner—Paul Loomis
Assistant Examiner—Duc Nguyen
Attorney, Agent, or Firm—Ronald D. Slusky; Geraldine D. Monteleone; Jeffrey M. Weinick

[57] ABSTRACT

In a method of administering a telephone local loop plant, a substantial portion—preferably at or above 80%—of the existing narrowband plant is caused to be "dedicated," so that constituent segments of an existing local loop therewithin are not allowed to be used to form other local loops when the existing loop is taken out of service. The remainder of the narrowband plant—the "non-dedicated" plant—is used to fill subscriber current orders for new service. Administration of the narrowband plant that has been dedicated is given over to an administrative system that is deployed to administer broadband facilities within the local loop plant. In preferred embodiment, the local loop plant is upgraded from narrowband to broadband in a way which gives priority to those geographical areas for which the costs of maintaining the narrowband plant are the greatest. The method, overall, provides a mechanism for reducing the costs associated with administering all of the narrowband plant using the legacy systems.

20 Claims, 8 Drawing Sheets

WIRE PAIR

DLC/WIRE PAIR

FIBER TO THE CURB

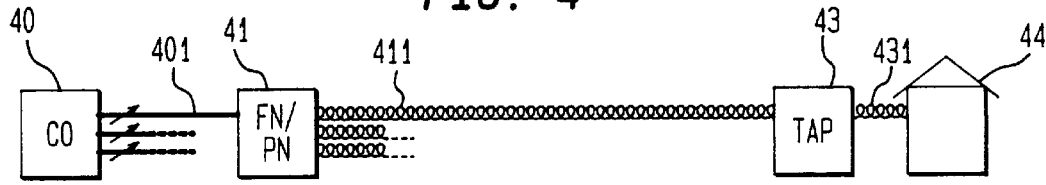
HYBRID FIBER COAX
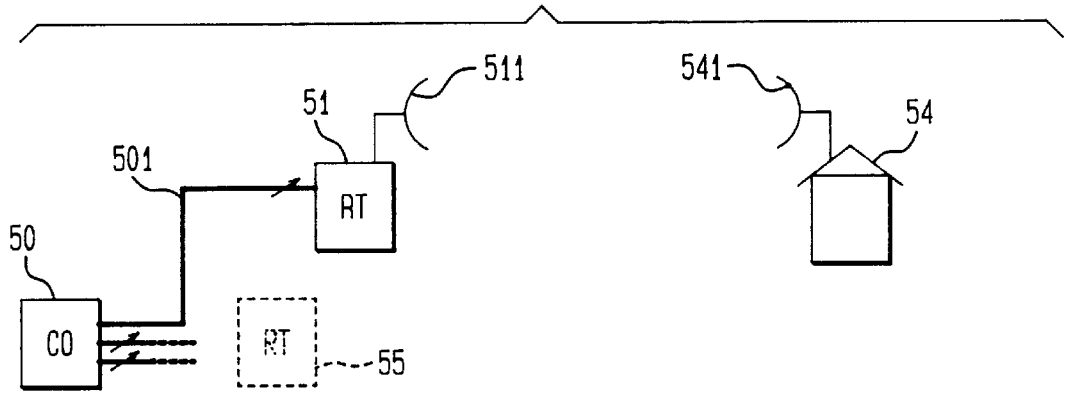
BROADBAND READY/FIXED WIRELESS
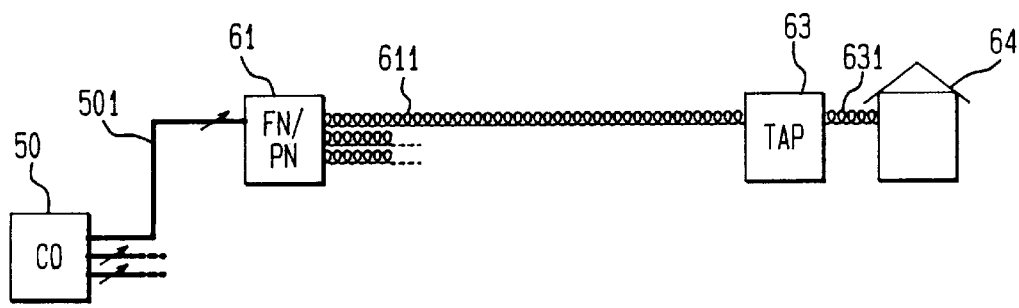
UPGRADED HYBRID FIBER COAX

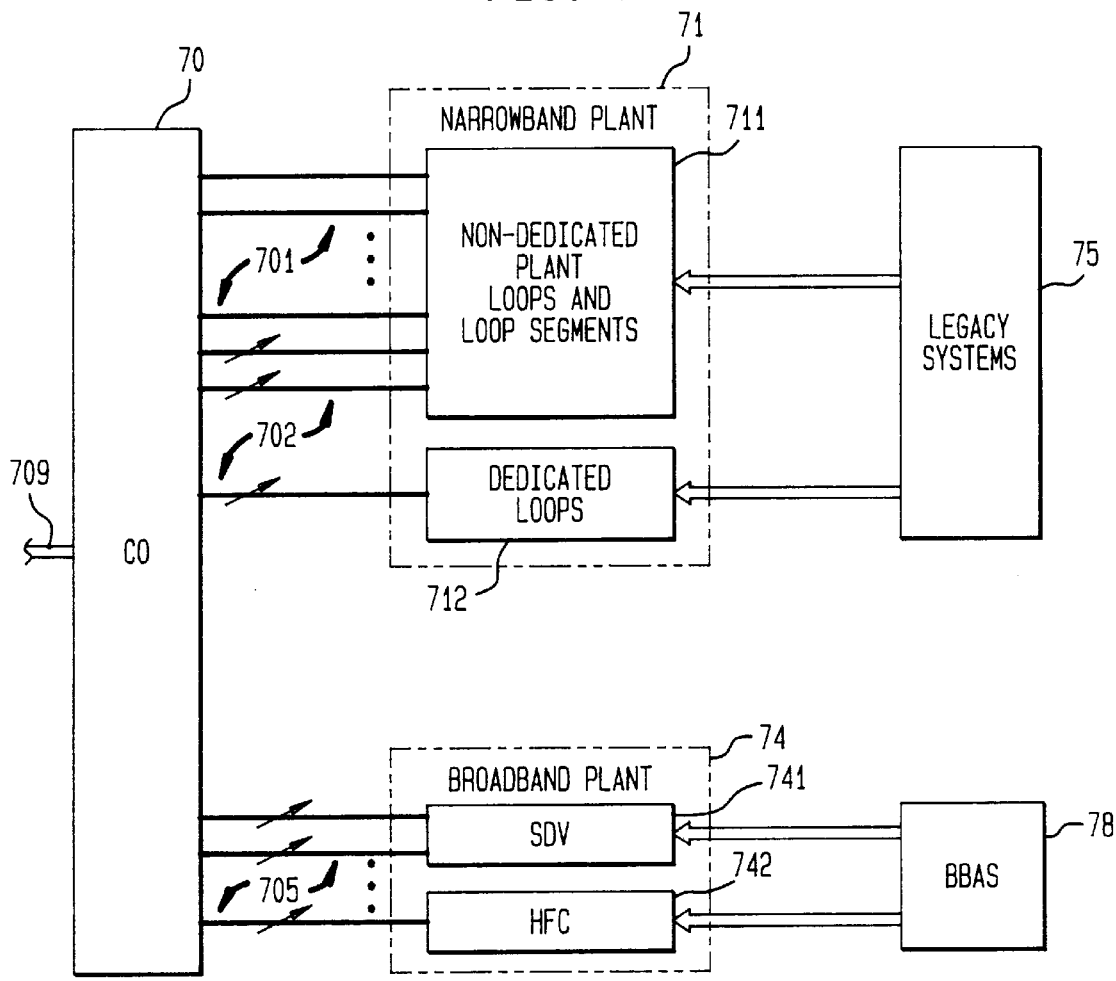

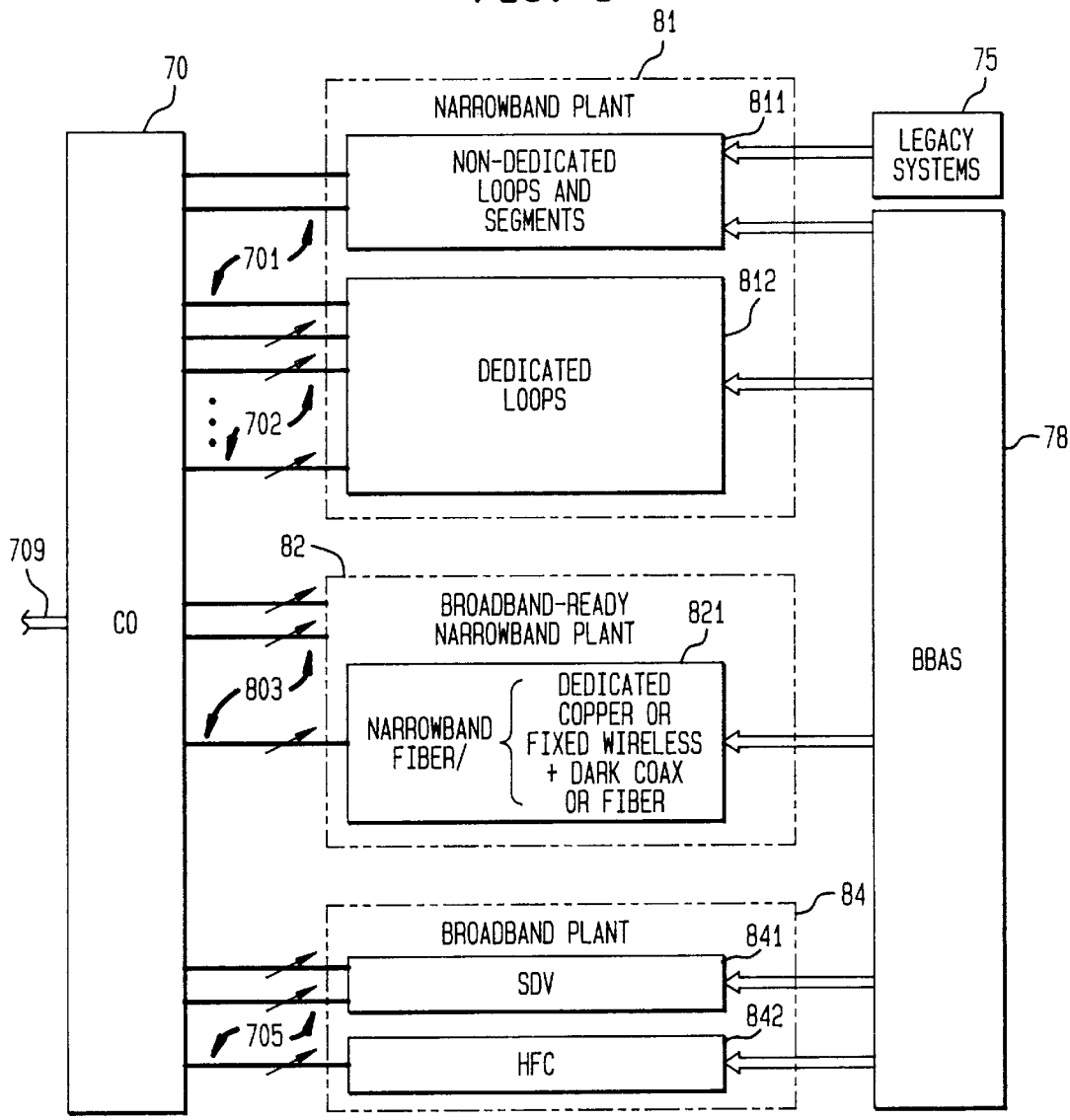

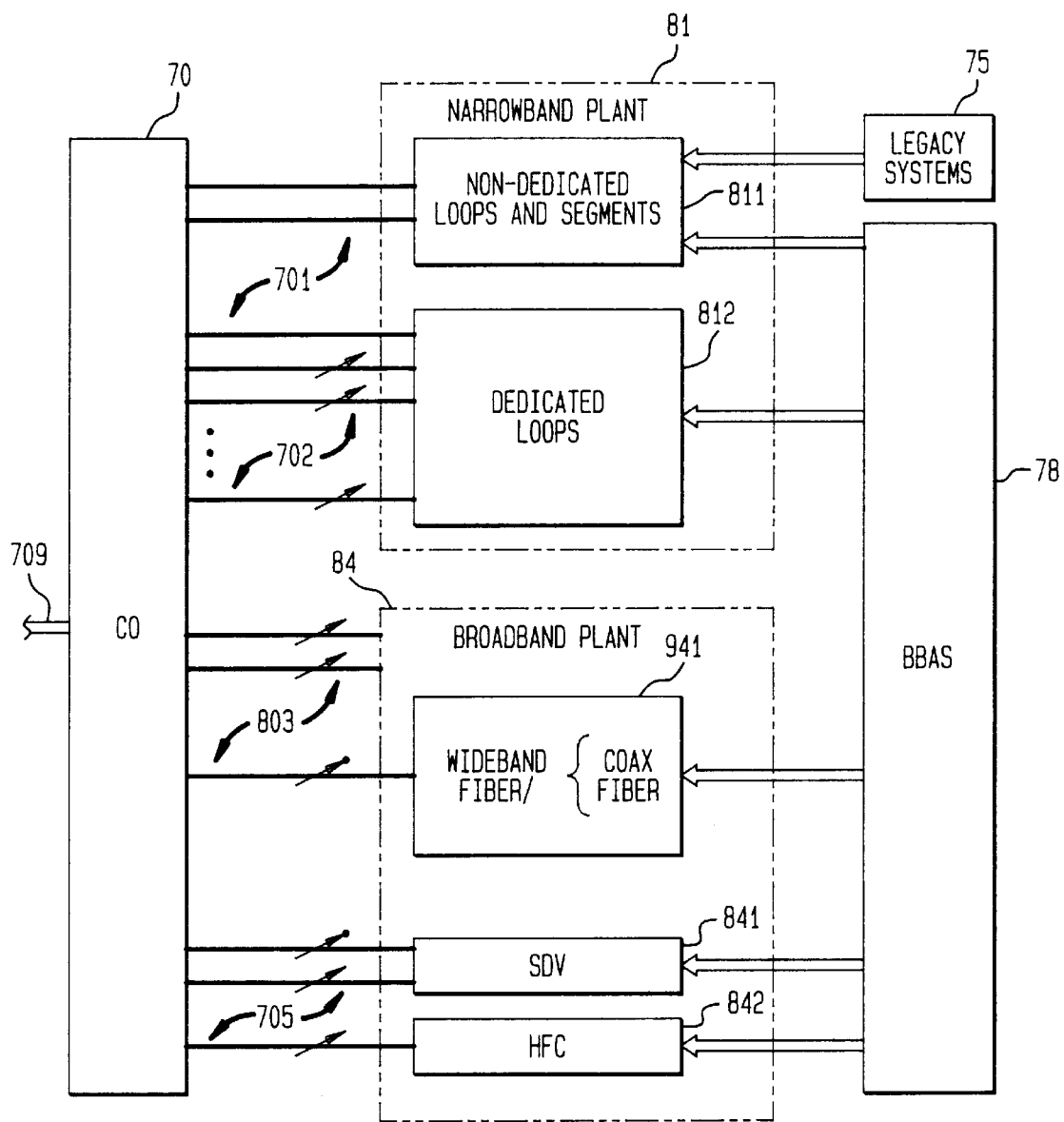

METHOD FOR IMPROVING THE ADMINISTRATION OF THE TELEPHONE LOCAL LOOP PLANT

BACKGROUND OF THE INVENTION

The present invention relates to telecommunications systems and, in particular, to the telephone local loop plant.

The access network interconnecting telephone central offices and terminal equipment at customer premise locations is conventionally referred to as the "local loop plant." This network is comprised, for each so-called "line," or "local loop," of a series of local loop segments extending from within a central office, through various cross-connection elements, to endpoints connected to the customer premises locations. In strictly-wire-pair-based arrangements, these cross-connection elements typically include the main distributing frame within the central office building; one or more feeder/distribution interfaces (FDIs) and/or cross-connects, typically housed in grade-level or aerial pedestal cabinets, or huts, or in subterranean vaults; and a serving terminal typically housed in an enclosure mounted on a utility pole or in a pedestal or on, or within, a building. The segment of the local loop extending between the central office and the FDI is called a feeder pair and may comprise a physical pair of wires or may comprise a "virtual" feeder pair in the form of a digital loop carrier (DLC) timeslot. The local loop segments extending beyond the FDI are called distribution pairs. And the segment extending from the serving terminal to the subscriber premises is called the drop pair, or drop.

The process of provisioning new wire-pair-based local loops and performing maintenance on the existing local loops is an expensive one. One principal source of expense is the labor cost associated with the need to dispatch craftpersons into the field to manually make cross-connections in the FDIs and serving terminals. In turn, a major part of this labor cost arises out of the fact that the typical new line or maintenance change in the local loop plant requires a number of rearrangements and that for a significant proportion of those rearrangements, an error is made—either in the rearrangement itself or in one or more administrative database entries that need to be made in consequence of the changes—engendering yet additional expense in order to correct the errors.

Another source of expense is the phenomenon called "churn" in which it becomes necessary to tear apart and reconfigure perfectly good individual loops and/or whole sections of the narrowband plant-borrowing from Peter to pay Paul—in order to accommodate an unexpected, and therefore unplanned-for, level of demand for new narrowband service in an area; or in order to provide wire-pair-based broadband, e.g., T1 or ISDN service; or in order to deal with maintenance problems that have arisen.

Yet another significant source of expense arises from the fact that the provisioning and maintenance of the existing local loop plant infrastructure involves the accessing and updating of records in as many as six or more administrative database systems. These administrative database systems contain, for example, detailed data for each local loop, specifying, among much other information, all of the local loop's feeder, distribution and drop pairs so that telephone craftpersons can, for example, a) identify which wire pairs between any two cross-connection elements are available to form newly provisioned loops, and b) troubleshoot reported local loop problems. This information is used in the course of managing and/or implementing such functions as order entry, service order processing, facilities assignment, installation, memory administration, trouble receipt, testing, trouble analysis and craftperson dispatch. Those skilled in art are quite familiar with such systems as COSMOS, LFACS and PREMIS used extensively throughout the so-called regional Bell operating companies (RBOCS). Given that these systems were developed in the 1970's and 80's at a time prior to the break-up of the Bell System in 1984, they represent a kind of legacy from the Bell System of the past, and indeed have come to be known in the art as the "legacy systems."

More specifically on the expense issue, the mere fact that the numerous functions just mentioned are divided up among many systems translates into high labor costs for database entry clerks, trainers to train those clerks and personnel to maintain the hardware and software of the various systems. In addition, the legacy systems were developed largely independently of one another over a period of time and, indeed, are fairly self-contained and operate pretty much independently of one another. As a result, they contain a great deal of redundant information. Thus each change in a subscriber's service necessitates making separate, often redundant entries in at least a number of these systems. Not only is this redundancy a cost factor in and of itself, but it also gives rise to additional costs associated with correcting the inevitable inconsistencies that, as the result of human error, occur among the databases maintained by the various systems. Moreover, the legacy systems are based on old technology, including mainframe computers that are dinosaurs by today's standards. Those computers require a great deal more maintenance and servicing than present-day computer systems, which adds further to their operational costs. Moreover, the legacy systems have cumbersome user interface characteristics which make them difficult, and thus expensive, to learn and to operate.

These problems will ultimately be obviated once the next generation of local access distribution systems has been put in place. In particular, each of the RBOCS is currently preparing, or has already begun, to transition its current local loop plant from the current narrowband wire pairs and DLCs to a broadband plant capable of supporting the many broadband services that are promised for the future, including, for example, video telephony, movies-on-demand, multimedia information access, high-speed data network access, and network-based games. Among the broadband local loop technologies currently being deployed or planned for deployment are so-called fiber-to-the-home, switched digital video and hybrid fiber coax.

Significantly, these broadband facilities are, or will be, administered by their own, state-of-the-art administrative database systems which do not suffer from the various limitations of the legacy systems as outlined above. For example, all of the administrative functionalities associated with AT&T's hybrid fiber coax technology-provisioning, testing and maintenance—are to be carried out by a single, integrated administrative database system, known as ASOS. Since all of the administrative functions will be carried out by a single system, the problems associated with having a multiplicity of systems are obviated. Moreover, ASOS will need to have far less functionality than the legacy systems because, for example, many provisioning and administrative tasks are carried out in the hybrid fiber coax facilities automatically and/or dynamically. This greatly cuts down on the amount of database clerk activity that is needed, and also greatly reduces the amount of data that needs to be stored about any particular local loop. Moreover, the hybrid fiber coax loops are all of one kind-dynamically assigned optical transmission system timeslots from the central office to a remote terminal, and coaxial cable channels from there to a so-called "tap" (which takes the place of the above-mentioned serving terminal used in wire-pair-based systems) and from the tap into the customer premises. This is in contrast to the existing narrowband plant, which includes a large number of different kinds of feeder and distribution pairs-loaded and unloaded, heavy gauge and thin gauge, etc.—which are allowed to be configured with one another in a myriad of different ways, requiring, in turn, administrative database systems which are sufficiently complex to account for all of that flexibility.

Unfortunately, it will be well into the next century before the country's local loop plant has been substantially converted from narrowband to broadband and, in the meantime, the existing narrowband loop plant must continue to be administered. However, the costs of continuing to use the legacy systems in their current form are so great that executives in the local operating companies are actively-indeed desperately-searching for something to do other than simply continue to suffer with what they have.

One apparent solution would be to commission the development of a completely new administrative system for the narrowband plant that would replicate the functionality of the legacy systems in a single system based on state-of-the-art hardware, software, database and user interface technology. It is well understood, however, that the legacy systems are, for many reasons, so complex, that the cost of designing and developing a system that would replicate their functionalities would be prohibitive—perhaps as much as $1 billion. This would be a hefty price to pay for a system whose only function would be to administer a local loop plant whose days are clearly numbered.

Another, possibly less expensive, alternative would be to somehow fix or upgrade the legacy systems without completely replacing them. However, there seems to be no clear idea of how to go about doing that.

At the moment, then, it would appear to the local operating companies that they have little alternative but to sit back and await the day, as much as 10–20 years hence, when the last of the narrowband facilities, and their ever-so-expensive and burdensome legacy administrative systems, have finally been retired from service.

SUMMARY OF THE INVENTION

The present invention provides another alternative.

In particular, the legacy system problem is substantially ameliorated, and at acceptable cost, accordance with the principles of the invention, by the following combination of steps to be carried out for any particular geographical area:

1. Freeze-the term of art actually being "dedicate"—a substantial portion—preferably at or above 80%—of the existing narrowband plant. That is, do not allow any of constituent segments of the local loops in this "dedicated" portion of the narrowband loop plant to be used to form other local loops when a loop is taken out of service. Thus, for example, if the subscriber at a particular location has canceled one of the subcriber's two incoming telephone lines, the feeder, distribution and drop pairs comprising the second local loop extending to the subscriber premises will be maintained as an interconnected entity from the central office all the way into the subscriber premises even though no service is being provided by the central office over that line at that time. Such a line will simply be left unused—perhaps to be once again used if a second line is again required at those premises, but perhaps never to be used again.

At the same time, continue to use the remainder (illustratively about 20% or less) of the narrowband plant— the "non-dedicated" plant—to fill subscriber current orders for new service.

2. Administer the narrowband plant that has been dedicated per (1) above using an administrative system that has been, or will be, deployed to administer broadband facilities. The non-dedicated narrowband plant could continue to be administered using the legacy systems. Alternatively, however, at least a portion of the functionalities now being performed by the legacy systems could be carried out by the broadband facilities' administrative system for all of the narrowband loops. Moreover, it may be advantageous to use that system to fully administer certain classes of the non-dedicated loops.

3. Optionally, but preferably, upgrade the local loop plant from narrowband to broadband in a way which gives priority to those geographical areas for which the costs of maintaining the narrowband plant are the greatest, those being a) the areas in which the amount of excess capacity left in the non-dedicated narrowband plant has become critically low after a period of time as the result of additional narrowband loops being provisioned out of the non-dedicated facilities and/or b) those areas that are proving to be the most expensive to administer as the result of experiencing, for whatever reason, a greater-than-average amount of the above-described "churn."

That this sequence of steps ameliorates the legacy system problem at acceptable cost can be seen by considering a number of interrelated factors.

In particular, since (illustratively) 80% or more of the narrowband plant will be dedicated, much of the above-outlined cost structure associated with churn and with the operation and staffing of the legacy systems will be greatly reduced, simply because there will be that much less of the narrowband facilities that outside craft will be allowed to "touch" and thus much less activity in the legacy system databases.

Moreover, the enhanced administrative system for broadband facilities that will be used to administer the dedicated narrowband plant will be much less expensive to develop and operate than a system that replicates the combined functionalities of the legacy systems. This results from the fact that each dedicated local loop—because it is dedicated—can now be administered as a single, end-to-end entity none of whose constituent parts, nor subscriber premise information, can change over time. More particularly, the significant information about such dedicated loops that can change over time will primarily, if not exclusively, be account information, (subscriber name, telephone number, etc.) and line status information ("active," "out-of-service," etc.). Thus the many possible scenarios that have to be taken into account when the feeder, distribution and drop pairs are allowed to be interconnected, disconnected and reconnected in a virtually unconstrained way would be eliminated. In essence, the dedicated narrowband loops can be administered very much as though they were loops in a broadband facility, such as hybrid fiber coax. (It will, however, probably be necessary, for purposes of maintenance and troubleshooting, to maintain within one of the legacy systems, e.g., LFACS, data records identifying the feeder, distribution and drop pairs comprising each dedicated loop.)

In addition, the costs associated with providing an upgrade of an existing broadband administrative system in order to be able to also administer the dedicated narrowband plant using such a system are much lower than those that would be required to design and develop a completely new system for that purpose. And, of course, it is much less expensive to operate one administrative system handling both the broadband and dedicated narrowband loops than to operate two separate systems. Additionally, although it is not required for the invention, yet further economies can be achieved by stripping out certain functionalities now being provided by the legacy systems, such as "dispatch," "telephone number administration," "testing" and "surveillance," and administering all of the narrowband plant—both the dedicated and the non-dedicated—via the broadband administrative system to the extent that that proves to be cost-effective for those functionalities. Moreover, it may be possible that the broadband administrative system could be used to administer, at least in part, certain classes of the non-dedicated loops, such as residential (as opposed to business) loops, cutting down even further on the amount of the overall loop plant that is administered by the legacy systems.

Once an operating company has implemented steps 1 and 2 above, the number of distribution and feeder pairs that will be available to provide new narrowband loops as they are ordered by subscribers in a given geographical area will be become depleted at a faster rate than would otherwise be the case. This is because the piece parts of currently unused loops, if they are in the dedicated plant, will simply be "off limits" for use in other loops.

We deal with this aspect of the problem not, however, by adding additional narrowband facilities in such areas. Rather, we have taken into account the fact that the operating companies have it in mind to replace virtually the entirety of the narrowband loop plant with broadband facilities at some point in time and, in accordance with a feature of the invention, per step 3 above, we prescribe that it should be those areas of the loop plant whose need for upgrade from narrowband to broadband proves to be the greatest (again, based on considerations of facility depletion and churn) that get upgraded first. This is in direct contradistinction to current operating company approach, which is principally to upgrade their local loop plant in geographically contiguous areas, e.g., starting at the north end of, say, a city, and working southward.

Those skilled in the art will appreciate from the foregoing that the present invention violates a number of principles that are generally accepted as "gospel" in the local operating companies.

In particular, and with reference to step 1 of our approach, it is significant to note that much of the local loop engineering and planning that is carried out in the local operating companies is based on, and motivated by, minimizing capital expense. Thus, for example, it is already known in the art that dedication of narrowband loops can cut down on operating expenses associated with provisioning and maintaining the loop plant. Indeed, many operating companies have now begun to dedicate all newly provisioned local loops. Moreover, some of the operating companies assert that they have dedicated all first lines entering a premises. It is our belief, however, that, contrary to our invention, none of the operating companies have their overall local loop plant dedicated at anywhere near the level that we propose in our invention because, as noted above, the greater the degree of dedication, the more rapid will be the depletion of the non-dedicated facilities available for new service. That, in turn, implies a hastening of the time at which additional narrowband facilities—more cables, more FDI's, more DLC channels, etc.—would have to be deployed in the area where the facilities were dedicated. That is, it hastens the time at which additional capital outlays will be required—something which the operating companies assiduously seek to avoid. Moreover, since the operating companies now know that they will eventually be replacing the existing narrowband facilities in an area (once the geographically-based schedule for broadband upgrade specifies that that area is now to be upgraded), they are all the more averse to the notion of any significant degree of dedication because any newly added narrowband facilities are going to replaced in the relatively short term.

Moreover, with respect to step 2 of our approach, it is significant to note that the art has a mindset that any administrative system for the existing narrowband plant must necessarily have substantially all the capabilities and flexibility of the legacy systems. Thus the thinking in the art runs directly counter to our notion of administering a large portion of the narrowband plant via a system which does not have all of those capabilities and flexibility. Specifically, the art does not seem to have appreciated, as we have, that existing narrowband facilities, once dedicated, can be administered in a much more streamlined way than at present by using the administrative systems being put in place for the broadband plant. It is certainly the case, for example, those local operating companies that have adopted at least a certain level of dedication in their narrowband plant have nonetheless continued to use the legacy systems to administer those facilities, albeit while trying the streamline them pursuant to a process which they call "flow thru."

And with respect to step 3 of our approach, it is significant to note that, as mentioned earlier, it is widely believed in the local operating companies that the best way to schedule upgrades from narrowband to broadband service, contrary to the present invention, is to do so in contiguous geographical areas, e.g. starting at the north end of, say, a city, and working southward, and to upgrade an entire central office at one time. They do this because it is thought to be the most economical way to deploy personnel and equipment.

In summary, it has remained for us to have appreciated that by simultaneously adopting a number of steps which run counter to current operating company conventional wisdom and practice, one of the operating companies' most nagging, and seemingly insoluble, problems can in fact be solved or, at least, substantially ameliorated.

BRIEF DESCRIPTION OF THE DRAWING

FIGS. 1–4 show various types of local loops that may exist in a particular local loop plant;

FIGS. 5 and 6 show local loop configurations relevant to the deployment of what we call broadband-ready plant;

FIG. 7 shows a present day local loop plant;

FIG. 8 shows the local loop plant of FIG. 7 after having been modified pursuant to the teachings of the present invention;

FIG. 9 shows the local loop plant of FIG. 7 at a point in time subsequent to that depicted in FIG. 8;

DETAILED DESCRIPTION

FIGS. 1–4 show various types of local loops that exist in telephone local loop plants.

Figure 1:
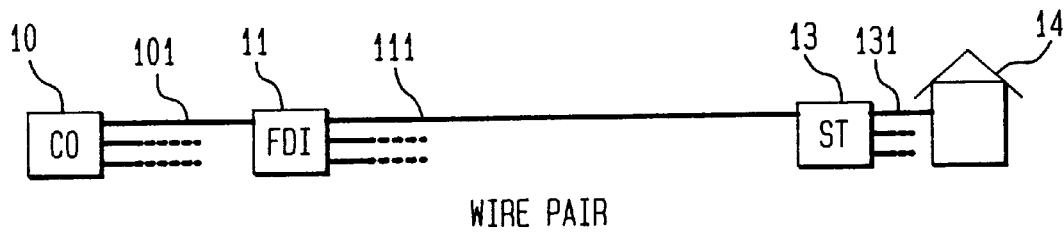

FIG. 1, in particular, shows what is still the most ubiquitous type of local loop. This loop extends from central office (CO) 10 to subscriber premises 14 and is comprised solely of interconnected copper wire pair segments, these being a wire pair within feeder cable 101, a wire pair within distribution cable 111 and drop pair 131. The various segments are cross-connected by feeder/distribution interface (FDI) 11 and serving terminal (ST) 13. Although not shown in the FIG., the interconnection between FDI 11 and ST 13 could include a plurality of wire pair segments which are cross-connected at various points along the loop within various cross-connect cabinets and the like.

Figure 2:
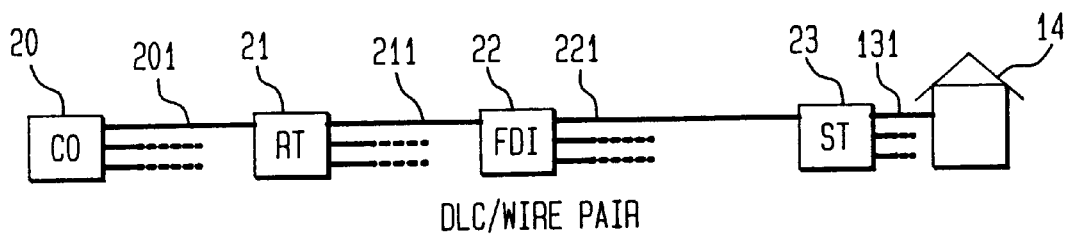

FIG. 2 shows another type of local loop also using only copper wire pair segments extending from central office 20 to subscriber premises 24. Here, however, cable 201 does not comprise a separate physical pair of wires for each loop. Rather, the feeder portion of the FIG. 2 local loop includes a so-called digital loop carrier (DLC) system, which is a time-division-multiplexing (TDM) arrangement in which a digitized version of the signal being carried over the loop in question is communicated between central office 20 and a so-called remote terminal (RT) 21 over cable 201 within a TDM timeslot that is associated with that loop. That timeslot may be provisioned to be permanently associated with the loop in question or, in so-called concentrating loop carrier systems, may be assigned on a call-by-call basis. Beyond remote terminal 21, the signal is in analog form and is carried over distribution pairs within cables 211 and 221 and drop pair 231, just as in the case of FIG. 1, those pairs being cross-connected by feeder/distribution interface 22 and serving terminal 23.

Figure 3:
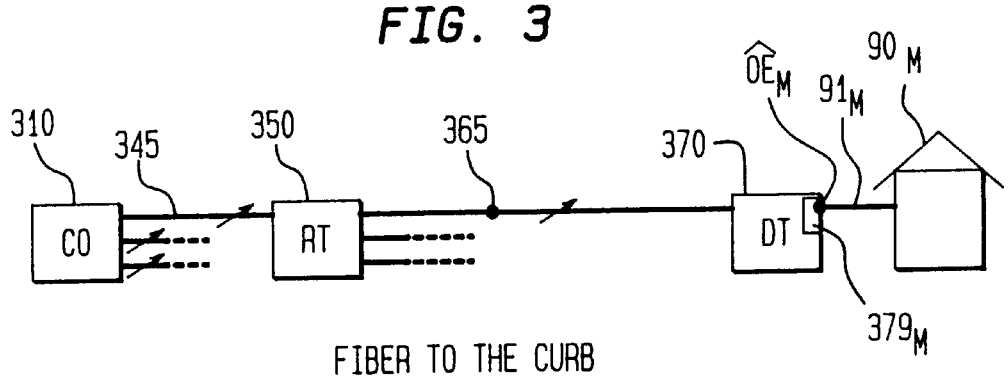

FIG. 3 shows yet another type of local loop implementing a fiber-in-the-loop technology referred to as fiber-to-the-curb. In particular, the local loop extends from central office 310 to a so-called distant terminal (DT) 370 (which, in fiber-based systems replaces the serving terminal used in wire-pair-based systems). It is made up of optical fiber segments 345 and 365, with only the drop $91_M$ connected to subscriber premises $90_M$ being a copper wire pair. (The other aspects of FIG. 3 are described at a more opportune point herein below.)

Further details about the types of local loops just described may be found throughout the prior art literature including, for example, U.S. Pat. No. 5,386,417 issued Jan. 31, 1995 to T. H. Daugherty et al, hereby incorporated by reference.

All of the above types of local loop technologies have been designed and deployed principally to support conventional POTS narrowband telephone service and, as such, the local loop plant that uses those technologies is often called the narrowband local loop plant. However, the narrowband plant can also support a wider bandwidth type of service, such as ISDN or T1 carrier if, for example, the segments of the wire-based loop plant are specifically conditioned and/or otherwise selected as having the characteristics necessary to support such services and/or a particular loop is provisioned to include more than one DLC or FITL timeslot.

Notwithstanding the foregoing, the existing local loop infrastructure is nowhere near adequate to fulfill the demand for broadband loops that is going to rise to revolutionary levels in the next decade in order to support video telephony, movies-on-demand and all the other broadband services looming on the horizon. Consequently, each of the local operating companies is currently preparing, or has already begun, to transition its current local loop plant from the current narrowband wire pairs and DLCs to a broadband plant.

If cost were no object, it is likely that operating companies installing brand new broadband local loop plant in a particular geographic area would opt for fiber-to-the-curb or fiber-to-the-home. Not only is optical fiber an excellent medium for supporting broadband signals, but it is much more reliable than, for example, coaxial cable which, over a period of time, can develop corrosion and other impairment-inducing problems. Unfortunately, today's cost of the electronics that are needed for a broadband fiber-to-the-curb system makes that approach unacceptably costly in most situations, even though the fiber itself is relatively cheap.

The operating companies are, however, moving ahead on the broadband front. In particular, most of the operating companies are planning for the future by installing fiber-in-the-loop systems for most new narrowband feeder plant so that at the point in time that they want to upgrade to broadband, the same fiber can be reused. (In addition, in those areas where new narrowband copper distribution plant is being buried, they could simultaneously lay coaxial cable or fiber in the same trenches, so that at the time of broadband upgrade, the broadband media will be in-place and ready to be "turned on," such initially unused coaxial and fiber cables being referred to as "dark coax" and "dark fiber.")

On the other hand, some operating companies see present business opportunities awaiting them if they get some kind of broadband plant into operation in the near future, and they have begun to install systems that, while perhaps not offering the advantageous long-term performance characteristics of an all-fiber system, are economically viable at this time. One of these is called switched-digital video (SDV), which comprises a (typically) fiber-to-the-curb, but narrowband, local loop for narrowband (e.g. POTS) service alone or with video-on-demand features in parallel with a fiber/coax loop intended for, for example, multichannel broadband service. However, more dominant at this time is hybrid fiber coax, which comprises fiber transmission in the feeder plant and coaxial cable in the distribution plant.

This is shown in FIG. 4, which depicts a hybrid fiber coax loop from central office 40 to subscriber premises 44. Circuitry within central office 40 and so-called fiber node/power node 41 support broadband frequency-division-multiplexed local loop service over optical cable 401. From there, the connection to subscriber premises 44 is by way of coaxial cable 411, tap 43 and coaxial drop 431. Hybrid fiber coax plant of this type is available from the Network Systems Group of AT&T Corp. under the trade name of HFC-2000TM Broadband Access System.

Attention is now directed to FIG. 7—the local loop configurations depicted in FIGS. 5–6 being discussed at a more opportune point herein below.

FIG. 7 shows a local loop plant of a type that exists today in which a central office supplies both broadband and narrowband service to a particular area. In particular, central office 70 serves narrowband plant 71 and broadband plant 74, and is connected to the overall network of which it is a part via trunks 709. The local loops which comprise narrowband plant 71 can be of any of the types (or indeed others) discussed herein above and thus include wire-based and fiber-based feeder cables 701 and 702, respectively. A portion of the narrowband plant comprises dedicated, in-service loops 712, the word "dedicated" being a term of art as described in detail herein above. The remainder of the narrowband plant is non-dedicated plant 711, which includes loops that are in service, loops that are idle (i.e., intact from the central office to a subscriber location but having no service currently provided over them), and loop segments that are not a part of any existing loop. As represented graphically in FIG. 7, substantially more of the overall plant is non-dedicated than dedicated.

The local loops which comprise broadband plant 74 can be of any of the types (or indeed others) discussed herein above and illustratively include fiber-based feeder cables 705. In this embodiment the broadband loops are of two types—switched digital video (SDV) loops 741 and hybrid fiber coax (HFC) loops 742.

The entire narrowband plant 71—which, as mentioned earlier, may actually support some amount of wideband service—is administered using legacy systems 75, as also discussed herein above. Broadband plant 74 is administered by way of its own BroadBand Administrative System, or BBAS, 78 which is independent of legacy systems 75.

Figure 10:
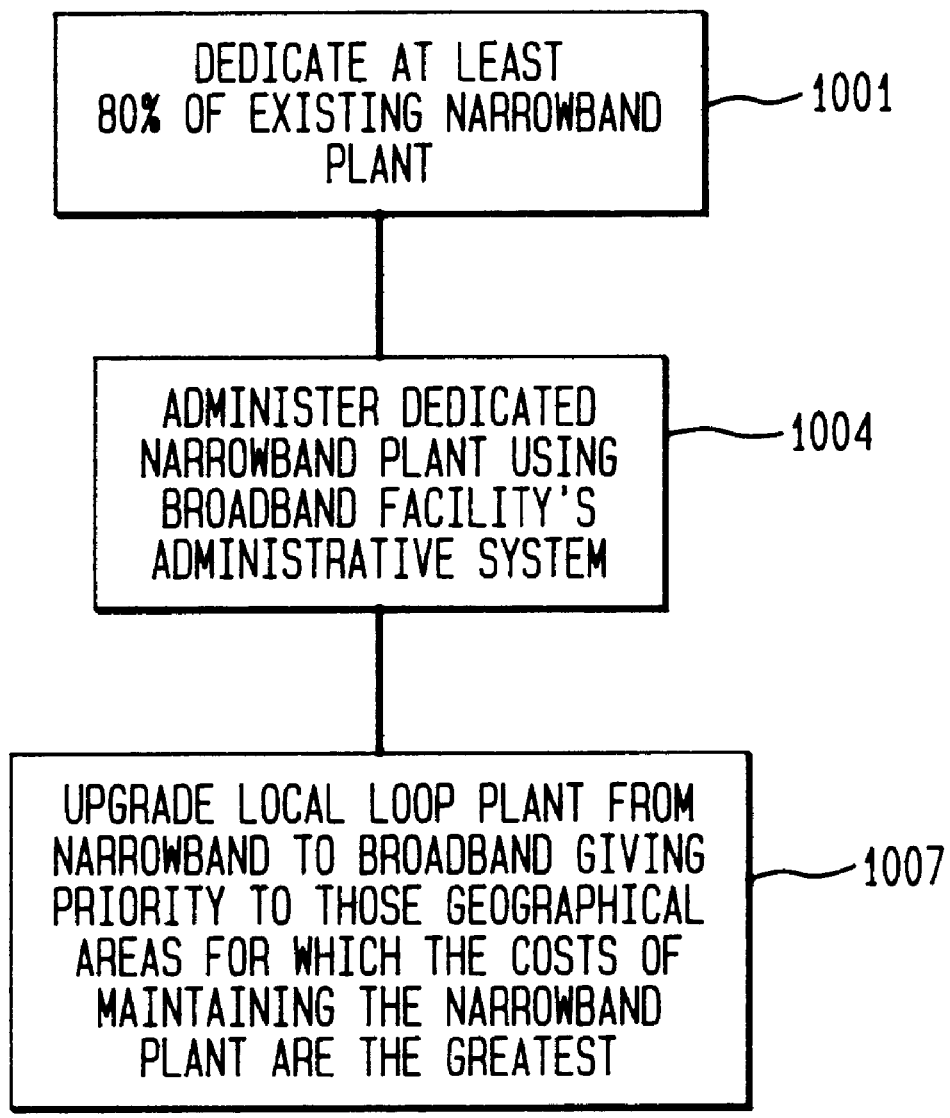
FIG. 10 shows the principal steps of the present inventive method.

The steps to be taken in carrying out the invention are shown in FIG. 10, the advantageous results accruing from following those steps having been described in detail herein above. In particular, our invention involves, at a minimum, following steps 1001 and 1004 as shown in FIG. 10, those steps comprising 1) dedicating a large proportion-illustratively about 80%—of the existing narrowband plant (step 1001), and 2) administering that dedicated narrowband plant using the same administrative system that is used to administer the broadband plant (step 1004).

The results of applying the invention to the local loop plant depicted in FIG. 7 can be seen in FIG. 8. In particular, it will be noted that dedicated loops 812 dominate the narrowband loop plant 81, taking up much more of the narrowband plant facilities than non-dedicated loops and segments 811. Moreover, BBAS 78 is now used to administer dedicated narrowband loops 812. In particular, functions that are common to both broadband and narrowband plant administration, such as "dispatch," "telephone number administration," "testing" and "surveillance," are administered by modules in BBAS 78 that already exist for administering the broadband plant. Functions that are unique to the narrowband plant are administered by upgrading BBAS 78 in a straightforward way to handle them.

Once an operating company has begun to implement the invention, such as depicted in FIG. 8, the number of distribution and feeder pairs available within non-dedicated plant 811 for new narrowband loops as they are ordered by subscribers in a given geographical area will be become depleted at a faster rate than would otherwise be the case. This is because the piece parts of currently unused loops, if they are in the dedicated plant 812, will simply be "off limits" for use in other loops.

We deal with this aspect of the problem not, however, by adding additional narrowband facilities in the area served by central office 70. Rather, we have taken into account the fact that the operating companies have it in mind to replace the entirety of the narrowband loop plant with broadband facilities at some point in time and, in accordance with a feature of the invention, we prescribe that it should be those areas of the loop plant whose need for upgrade from narrowband to broadband proves to be the greatest—based on considerations of facility depletion and churn—that get upgraded first. Such areas could be as limited as a particular narrow geographical corridor served by a particular central office or could be as expansive as the entirety of the local loop plant served by an office. This is in direct contradistinction to current operating company approach, which is principally to upgrade their local loop plant in geographically contiguous areas, e.g., starting at the north end of, say, a city, and working southward, and to upgrade an entire central office at one time.

Figure 11:
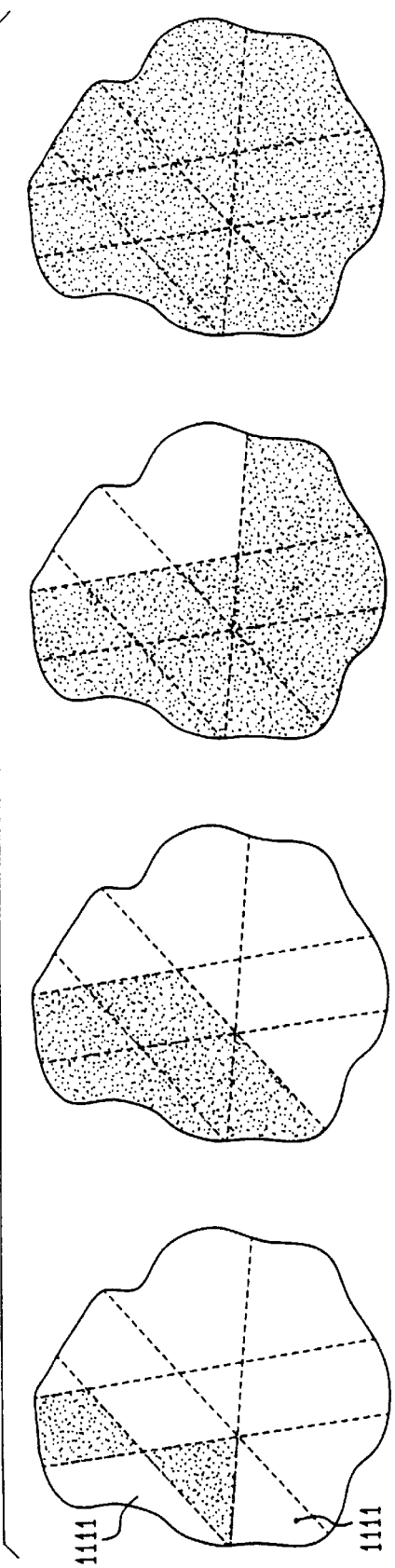
FIG. 11 shows the geographically based approach under which the local operating companies currently upgrade their local loop plants from narrowband to broadband.
Figure 12:
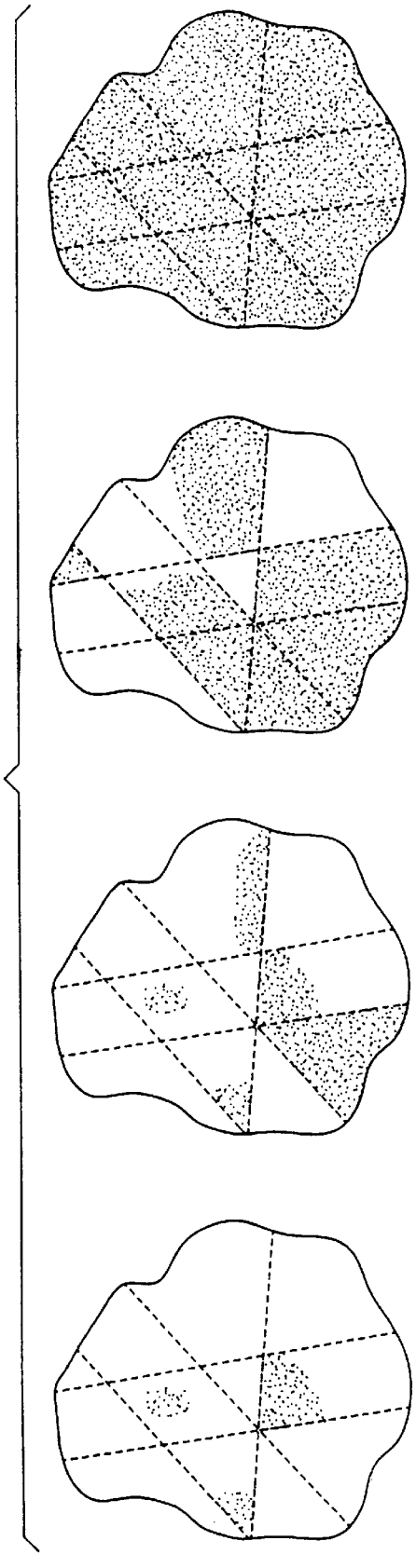
FIG. 12 shows the manner in which, contrary to the approach of FIG. 11, the upgrading from narrowband to broadband is carried out pursuant to a feature of the present invention.

FIGS. 11 and 12 show this feature of the invention. In particular, FIG. 11 shows a large city divided into central office serving areas 1111 and in its various views, gives an illustration of how, in accordance with present practice, the entire city might be upgraded to broadband over time by upgrading entire, geographically contiguous districts one after the other. By contrast, FIG. 12 shows the approach that we propose in which, also, the entire city will ultimately be upgraded, but on a rifle-shot basis in which areas whose need for upgrade proves to be the greatest at any point in time get upgraded first.

Returning, now to FIG. 8, it will be seen that broadband-ready narrowband plant 82 has now been deployed. Broadband-ready plant 82 is comprised of a feeder system which uses fiber cables 803 to implement a feeder system based on narrowband fiber-in-the-loop technology and a distribution system comprised of dedicated fixed wireless plant or copper plant. If the copper plant is buried, as opposed to being aerial plant, dark coax or dark fiber will have been buried along with it, as mentioned above, in order to reduce future costs. Broadband-ready plant is also administered by BBAS 78.

Although not required for the invention, yet further economies can be achieved, also shown in FIG. 8, by stripping out certain functionalities now being provided by legacy systems 75, such as "dispatch," "telephone number administration," "testing" and "surveillance," and administering all of narrowband plant 81—both the dedicated and the non-dedicated parts—via BBAS 78, to the extent that that proves to be cost-effective for those functionalities. Moreover, it may be advantageous, and possible within realistic budget constraints to configure BBAS 78 in such a way as to administer, at least in part, certain classes of the non-dedicated loops 811, such as residential (as opposed to business) loops, cutting down even further on the amount of the overall loop plant that is administered by legacy systems 75.

FIG. 9 shows the local loop plant of FIGS. 7 and 8 in a further stage of maturity. The broadband-ready plant has now been converted to broadband fiber coax or broadband fiber/fiber (i.e., fiber-to-the-curb) and is administered by BBAS 78. At least some of the subscriber premises that were originally served via the narrowband plant are now being served by broadband facilities and thus as shown in the FIG., the portion of the local loop plant that remains served by narrowband facilities has substantially shrunk, as has, therefore, the degree of reliance on legacy systems 75.

It is opportune at this point to describe two aspects of engineering the broadband-ready plant that are not required for the present invention but which may be advantageously used as part of an overall plan for upgrading a local loop plant from narrowband to broadband.

The first of these relates to the physical deployment of remote terminals (RTs). In particular, one of us (Coy) has recognized that it is advantageous to a) engineer the narrowband plant—and, in particular, to choose geographic locations for RTs thereof—by using engineering rules that actually apply to the placing of RTs for the broadband plant—not, as one would expect, for the narrowband plant—and, at the same time b) using a physical design for the narrowband e.g., DLC or fiber-in-the-loop, RTs which will also accommodate the broadband RT electronics. In particular, with respect to a) above, it is to be noted that the economics of, for example, hybrid fiber coax are such that an engineering plan for same could specify an RT for every, say, 500 living units. By contrast, the economics of DLC or fiber-in-the-loop are such that a typical engineering plan might specify a RT to serve something on the order of 2000 living units on average. Thus by following this approach, as many as three or four narrowband RTs will have to be installed when just one will suffice—a seemingly disadvantageous thing to do, of course.

What has been recognized, however, is that the additional cost of deploying more narrowband RTs than necessary will be more than compensated for once the upgrade to broadband has been made because the broadband RTs will then be optimally placed and, as a result of b) above, the physical plant on site can be re-used with little or no modification.

This approach is illustrated in FIGS. 5 and 6. FIG. 5, in particular, shows a local loop in which a fiber-in-the-loop feeder cable 501 extends from central office 50 to RT 51. From there, service is extended to subscriber premises 54 via a fixed wireless link supported by antennas 511 and 541. Alternatively, the link between RT 51 and subscriber premises 54 could be a wire-pair-based or DLC-based link which includes one or more distribution cables and a drop, all interconnected in conventional fashion via an FDI, one or more cross-connects and a serving terminal. If one were engineering this portion of the loop plant without regard to broadband readiness, the RT on which cable 501 terminates would have been physically placed at a location called out in the drawing at 55. However, pursuant to the approach outlined above, the most economical place for such a RT from the perspective of the installation of broadband service is the location where RT 51 has actually been placed. Thus when, as shown in FIG. 6, this portion of the local loop plant is, in fact upgraded to (illustratively) hybrid fiber coax, the electronics within RT 51 can be removed and the hybrid fiber coax electronics can be installed in the same physical plant—the RT thereupon becoming a fiber node/power node 61. At the time of upgrade, the portion of the loop beyond node 61 will become a hybrid fiber coax coaxial cable 611 which serves customer premises 64 via network interface unit (NIU) 63 and coaxial drop 631.

The second aspect relating to engineering of the broadband-ready plant is related to teachings set forth in the above-cited Daugherty et al U.S. Pat. No. 5,386,417. Daugherty discloses a type of local loop shown in FIG. 3. Indeed, the reference numerals in FIG. 3 correspond generally to those used in FIG. 3 of the Daugherty patent. The only significant difference (which is actually not significant for purposes of the present discussion) between the arrangement of FIG. 3 and that shown in FIG. 3 of Daugherty is that in the latter, link 345 is a DLC link rather than a fiber-in-the-loop link. It may also be noted that elements 350 and 370, referred to in Daugherty as a "remote terminal" (RT) and "distant terminal" (DT), respectively, are more commonly now referred to in the art as an HDT and optical network unit (ONU), respectively. For consistency with Daugherty, however, this description will continue to use the terms RT and DT. (It may also be noted than in some fiber-to-the-curb systems, the functionality of the HDT may be performed within the central office, so that the fiber run extends from the central office uninterrupted out to the DT.)

The Daugherty patent describes a technique wherein timeslot interchange cross-connections in RT 350 and DT 370 are created on a call-by-call basis based on routing information stored in those terminals and in the central office. That routing information, in turn, is developed in response to self-report information that is transmitted upstream by DT 370 when it is first installed. The self-report information, more particularly, includes an identification of each local loop endpoint within the DT (such as $OE_M$) each such endpoint being the physical connection point of a DT service port ($379_M$) to the associated drop pair ($91_M$) for a subscriber premises ($90_M$).

Figure 13:
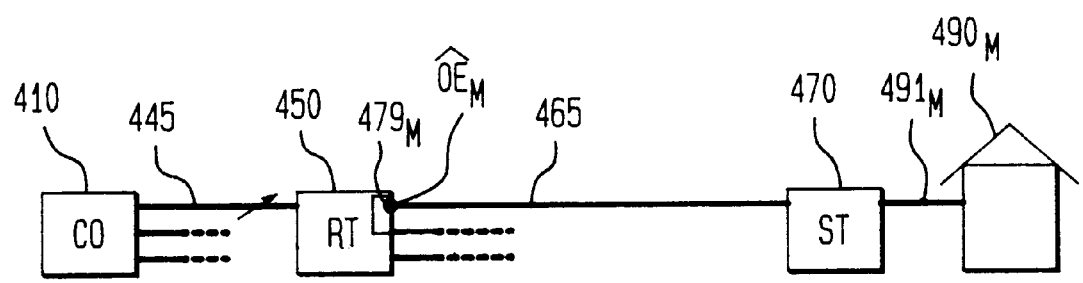
FIG. 13 shows a type of local loop configuration in which timeslot interchange cross-connections are made dynamically based on self-report information that originates from within the local loop at a point which, in contradistinction to the prior art, is other than at or near the subscriber premises

What one of us (Bernstein) has realized is that while the advantages arising out the technique described in the Daugherty patent may well be best achieved when implemented along the entire local loop, as just described, it may well be advantageous to implement it across less than all of the local loop. This is shown in FIG. 13, which represents a broadband-ready local loop connecting central office 410 to subscriber premises ($490_M$) via fiber link 445, RT 450, wire pair 465, serving terminal 470 and drop ($491_M$). Here, the starting point from which the self-report information as described by Daugherty originates and propagates upstream toward the central office is broadband-ready service port $479_M$ rather than being the service port connected all the way down at the drop point, as in FIG. 3. Indeed, in the broadband-ready loop depicted, ST 470 is a conventional serving terminal for wire-pair-based loop segments and does not, in fact, have the capability to transmit any self-report information. In essence, the OEM of Daugherty has been moved upstream from the DT to the RT.

This approach is advantageous because, first of all, it allows for the advantages taught by Daugherty to be realized to at least some extent, i.e., from central office 470 out to RT 450. Moreover, it will be relatively inexpensive to deploy, given that the incremental cost will be relatively small to implement the Daugherty technique in broadband-ready RTs that are being newly installed. The full-blown Daugherty technique, wherein self-report information originates from the DT can be realized at a later time when the broadband-ready plant is upgraded to broadband and serving terminal 470 can be replaced by a DT which has self-report capability. Thus at least some of the advantage of the Daugherty technique can be realized in the short term without disrupting the overall scheme for deploying narrowband-but-broadband-ready plant wherein conventional narrowband (copper or fiber) facilities connect the broadband RTs to the subscriber premises.

Finally, we present some additional discussion of that aspect of the invention which relates to dedication within the narrowband loop plant.

In particular, it may well be the case that in the existing loop plant, a high percentage of the loops served by a particular central office may already be dedicated. However, we are not aware of any overall loop plant within the geographic area served by a relatively large group of central offices, such as those that are served by a particular legacy system installation, that is dedicated at anywhere near the levels that we envision for our invention. Thus, the division of narrowband plant 71 between dedicated and non-dedicated plant as shown in FIG. 7 for the single central office 70 should be understood as being archetypal, and emblematic of the broader picture.

In addition, in achieving the level of approximately 80% dedication that we currently believe is the best level of dedication to realize the advantages of the invention, we suggest one of the following two possible approaches:

1. Dedicate substantially all first lines, be they in-service or idle, serving existing premises;
2. Dedicate substantially all newly provisioned second lines; and
3. Dedicate as much additional plant as can be justified, taking into account costs and other factors.

Or

1. In "mature" areas where a substantial portion of the narrowband plant already comprises in-service or idle loops, dedicate about 95% of the in-service loops and about 80% of the idle loops.
2. In "non-mature" areas where a relatively smaller amount of the narrowband is taken up with in-service or idle loops, dedicate all such existing loops and continue to dedicate all new loops as they are provisioned until such time as the overall narrowband plant has achieved an overall "fill" rate" of about 80%, meaning that about 80% of all feeder and distribution pairs are in dedicated loops.

In either case, the "population" of loops to which the dedication process could be applied could be a selected group of feeder cables and as the process is extended to more and more of the narrowband plant, it should be undertaken on a feeder-cable-by-feeder-cable basis, with the corresponding distribution plant also then being dedicated. The choice of which feeder cables could be selected can be based on any one or more of a number of possible criteria. For example, the feeder cables can be those a) in particular geographic areas, b) implemented via a particular technology (e.g., interconnected wire pairs, DLC, etc.), c) serviced by particular craft work centers or system support areas, d) having particular subscriber demographics, e) having high-maintenance cost, such as where a two-person crew policy is in place or where the plant is degenerating or has been subject to a natural disaster, or f) where line growth is expected to be high due to real estate develpment or the expectation of a growth in the demand for enhanced services. The process just described could be reversed such that the outlined criteria are applied, in the first instance, to the distribution portion of the narrowband plant and, in their turn, the corresponding feeder cables.

The foregoing merely illustrates the principles of the invention. Those skilled in the art will be able to devise numerous arrangements and techniques which, although not explicitly shown or described herein, embody those principles and are thus within the spirit and scope of the invention.

We claim:

1. A method for use in the administration of at least a portion of a telephone local loop plant, said administration including performance of at least one provisioning function, said telephone local loop plant including local loops of a narrowband plant and local loops of a broadband plant, said broadband plant being administered by an administrative system, the method comprising the steps of dedicating enough of the facilities of said narrowband plant as to cause, overall, at least 80 percent of said narrowband plant to be dedicated, and administering the dedicated portion of said narrowband plant using said broadband plant administrative system, said performance of at least one provisioning function being based on information contained in said administrative system.

2. The invention of claim 1 comprising the further step of sequentially upgrading portions of said narrowband plant to broadband in a sequence which gives priority to those portions of the narrowband plant whose non-dedicated facilities are the most costly to administer.

3. The invention of claim 2 wherein said most-costly-to-administer non-dedicated facilities include those experiencing a greater level of churn than other non-dedicated facilities.

4. The invention of claim 2 wherein said most-costly-to-administer non-dedicated facilities include those having a higher fill level than other non-dedicated facilities.

5. The invention of claim 1 wherein prior to the initiation of said administering step, said narrowband plant was administered by a predetermined number of legacy administrative systems, and wherein after the initiation of said administering step, said dedicated portion of said narrowband plant is administered by less than said number of legacy administrative systems.

6. The invention of claim 5 comprising the further step of administering, at least in part, at least some of the non-dedicated facilities of said narrowband plant using said broadband plant administrative system.

7. The invention of claim 1 wherein said at least one provisioning function is selected from the group consisting of order entry, service order processing, and installation.

8. A method for use in the administration of at least a portion of a telephone local loop plant, said administration including performance of at least one maintenance function, said telephone local loop plant including local loops of a narrowband plant and local loops of a broadband plant, said broadband plant being administered by an administrative system, the method comprising the steps of dedicating enough of the facilities of said narrowband plant as to cause, overall, at least 80 percent of said narrowband plant to be dedicated, and administering the dedicated portion of said narrowband plant using said broadband plant administrative system, said performance of at least one maintenance function being based on information contained in said administrative system.

9. The invention of claim 8 wherein said at least one maintenance function is selected from the group consisting of trouble receipt, trouble analysis, craftperson dispatch, troubleshooting, surveillance, and telephone number administration.

10. The invention of claim 9 comprising the further step of sequentially upgrading portions of said narrowband plant to broadband in a sequence which gives priority to those portions of the narrowband plant whose non-dedicated facilities are the most costly to administer.

11. The invention of claim 10 wherein said most-costly-to-administer non-dedicated facilities include those experiencing a greater level of churn than other non-dedicated facilities.

12. The invention of claim 10 wherein said most-costly-to-administer non-dedicated facilities include those having a higher fill level than other non-dedicated facilities.

13. The invention of claim 9 wherein prior to the initiation of said administering step, said narrowband plant was administered by a predetermined number of legacy administrative systems, and wherein after the initiation of said administering step, said dedicated portion of said narrowband plant is administered by less than said number of legacy administrative systems.

14. The invention of claim 13 comprising the further step of administering, at least in part, at least some of the non-dedicated facilities of said narrowband plant using said broadband plant administrative system.

15. A method for use in the administration of at least a portion of a telephone local loop plant, said administration including performance of a testing function, said telephone local loop plant including local loops of a narrowband plant and local loops of a broadband plant, said broadband plant being administered by an administrative system, the method comprising the steps of dedicating enough of the facilities of said narrowband plant as to cause, overall, at least 80 percent of said narrowband plant to be dedicated, and administering the dedicated portion of said narrowband plant using said broadband plant administrative system, said performance of said testing function being based on information contained in said administrative system.

16. The invention of claim 15 comprising the further step of sequentially upgrading portions of said narrowband plant to broadband in a sequence which gives priority to those portions of the narrowband plant whose non-dedicated facilities are the most costly to administer.

17. The invention of claim 16 wherein said most-costly-to-administer non-dedicated facilities include those experiencing a greater level of churn than other non-dedicated facilities.

18. The invention of claim 16 wherein said most-costly-to-administer non-dedicated facilities include those having a higher fill level than other non-dedicated facilities.

19. The invention of claim 15 wherein prior to the initiation of said administering step, said narrowband plant was administered by a predetermined number of legacy administrative systems, and wherein after the initiation of said administering step, said dedicated portion of said narrowband plant is administered by less than said number of legacy administrative systems.

20. The invention of claim 19 comprising the further step of administering, at least in part, at least some of the non-dedicated facilities of said narrowband plant using said broadband plant administrative system.

* * * * *